United States Patent Office 3,606,314
Patented Sept. 20, 1971

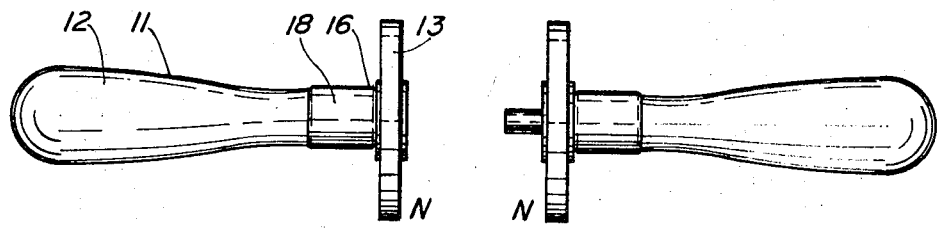
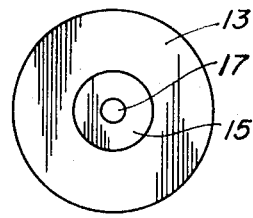
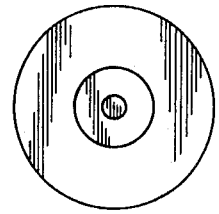
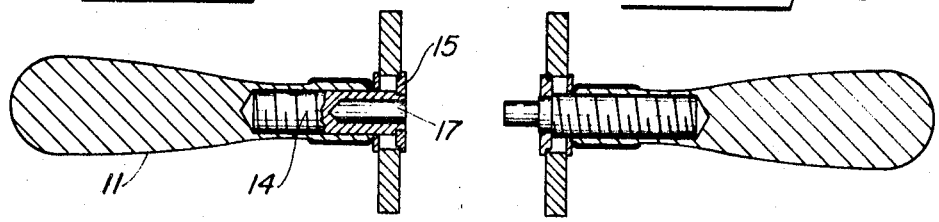
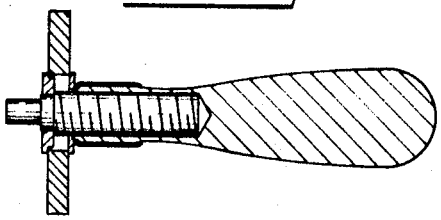
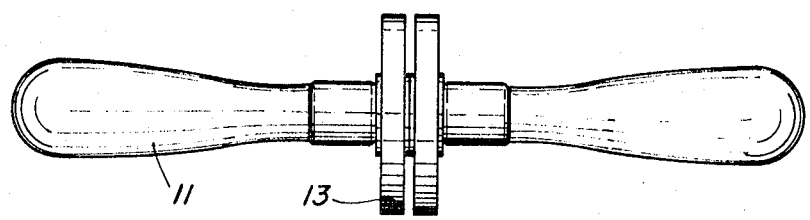
INVENTOR.
CHARLES G. POPP
BY

3,606,314
MAGNETIC TEACHING GAME
Charles G. Popp, 1712 S. Clifton,
Park Ridge, Ill. 60068
Filed July 16, 1969, Ser. No. 842,209
Int. Cl. A63b 21/00
U.S. Cl. 272—57R      3 Claims

ABSTRACT OF THE DISCLOSURE

Magnetic game apparatus to be played-used by the physically and mentally handicapped. Comprises, with various refinements, a pair of circular, repelling magnets which are adapted to mate with each other. The student develops manual dexterity and the ability to follow simple instructions by attempting to mate the two magnets in opposition to the repelling forces.

BACKGROUND OF THE INVENTION

The problems of teaching the mentally or physically handicapped child are, of course, well-known. Oftentimes, in either case one finds a combination of deficiencies in physical agility and the ability to follow instructions of varying degrees of difficulty. Developing physical dexterity and at the same time providing an instructional program which is meaningful to the child have long taxed the experts in these fields, and I have developed a simple teaching apparatus which provides assistance in the development of physical agility and at the same time permits the child, the student, to be taught to follow simple instructions. By using this device I have found that many of these physically and mentally handicapped children achieve a great deal of personal satisfaction in being able to successfully achieve the simple test imposed by such a device.

In using the present apparatus the student is required to mate, that is, to place a pointer of one of the magnet pairs into an orifice located on the other of the magnet pair. The magnets are set up so as to repel each other, a feature which adds interest and difficulty to the game.

All of the foregoing will be described in some greater detail as this description proceeds.

Accordingly, a principal object of my invention is to provide a magnetic game to be played by the physically and/or mentally handicapped to teach them physical dexterity and the ability to follow simple instructions.

Another object of my invention is to provide a pair of opposed, mateable magnetic pairs, hand-held, for use by the handicapped.

These and other objects, features and advantages of my invention will become apparent to those skilled in this art from the following detailed disclosure thereof and the accompanying drawings in which:

FIG. 1 is a side view of one type of apparatus for comprising the present invention;

FIG. 2 is a right-end view of the left-hand member of FIG. 1;

FIG. 3 is a left-end view of the right-hand member of FIG. 1;

FIGS. 4 and 5 are sectional views of the left- and right-hand members respectively of FIG. 1; and FIG. 6 illustrates the mating members of FIG. 1 as mated.

DESCRIPTION OF THE PREFERRED EMBODIMENT

Before describing the various embodiments of my invention, some of which are illustrated in the drawings, I would note that the magnetic force which is used in the present teaching device, while adding difficulty, is primarily used to develop among other things prehensile grip, improved finger dexterity, improved visual motor coordination and to lengthen the attention span. In addition, the apparatus is useful in discovering the dominant hand of the individual, causes the individual to become aware of the fact that he has hands, a feature which some of these unfortunates do not have, and at the same time provides fun and challenge while learning, i.e., helps the student think and concentrate.

The object of the game is to mate the two magnetic, repelling members by inserting a pin into a recess on the other. How this is done and the structure will be now described.

The left hand member 11 has a handle 12 to which is affixed a ring magnet 13. A threaded flange member 14 fits through the hole of the ring magnet to engage inner threads in such handle. The flange portion 15 is of slightly greater circumference than the ring magnet hole to thereby secure the magnet onto the handle. A washer 16 is also included in the structure. I also provide a hole 17 in the threaded member 14 for mating purposes. There is also present a ferrule 18 on the handle.

The right hand member 21 is very similar in construction to the left. It has a handle 22 to which is affixed a ring magnet 23. A threaded flange member 24 fits through the hole of the ring magnet to engage inner threads in such handle. The flange portion 25 is of slightly greater circumference than the ring magnet hole to secure the magnet onto the handle. A washer 26 is likewise included in the structure.

In this member I provide a circular extension, a pin-like member 27 adapted to be received by the hole 17 of the other member pair. The student is to insert such pin in said hole to mate the left and right hand members as illustrated in FIG. 6. While this looks simple, in view of the magnetic repulsion and the illness of the user, such mating is not particularly easy to accomplish.

There is also present a ferrule 28 on the handle 21.

It will, of course, be apparent that the mating pairs aforesaid may be reversed. It is also apparent that other types of handles may be used with these devices or that the handles may be eliminated.

Furthermore, to vary the difficulty, pin length may be varied.

It will be understood that various modifications and variations may be effected without departing from the spirit or scope of the novel concept of my invention.

I claim as my invention:
1. A game comprising:
  (a) a pair of ring magnets having opposite sides of opposite polarity;
  (b) a pair of handles, one mounted to each magnet on the side of the same polarity; and
  (c) means associated with each magnet adapted to permit the magnets to mate with each other.
2. The game claimed in claim 1 wherein said mating means comprise a projection mounted to one of said mag- nets on the side opposite the handle, and the other magnet having a bore adapted to receive said projection.

3. The game claimed in claim 2 wherein said projection is a pin coaxial with said handle and extending forwardly therefrom and said bore is aligned with the handle.

References Cited

UNITED STATES PATENTS

| | | | |
|---|---|---|---|
| 1,605,703 | 11/1926 | Brown | 273—1(M)UX |
| 2,158,368 | 5/1939 | Hurt | 273—1(M)UX |
| 3,041,697 | 7/1962 | Budreck | 46—241UX |
| 3,082,004 | 3/1963 | Friedman | 273—1(M)X |
| 3,303,606 | 2/1967 | Mann | 46—241 |

ANTON O. OECHSLE, Primary Examiner

P. E. SHAPIRO, Assistant Examiner

U.S. Cl. X.R.

35—19A, 29R; 46—236, 241; 128—25; 272—79R; 273—1M